United States Patent
Shmulevich et al.

(10) Patent No.: US 10,565,410 B1
(45) Date of Patent: Feb. 18, 2020

(54) OVERHEAD RFID ANTENNA

(71) Applicant: Amazon Technologies, Inc., Seattle, WA (US)

(72) Inventors: Roman Shmulevich, Woodbridge (CA); Oleg Kantor, Kirkland, WA (US); Tak Keung Joseph Lui, Bellevue, WA (US); David Bruce McCalib, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/687,155

(22) Filed: Aug. 25, 2017

(51) Int. Cl.
| | |
|---|---|
| G06K 7/10 | (2006.01) |
| G06Q 10/08 | (2012.01) |
| B07C 3/10 | (2006.01) |
| B07C 3/00 | (2006.01) |
| B07C 7/00 | (2006.01) |
| H01Q 1/22 | (2006.01) |
| G06K 19/077 | (2006.01) |

(52) U.S. Cl.
CPC .......... G06K 7/10386 (2013.01); B07C 3/008 (2013.01); B07C 3/10 (2013.01); B07C 7/005 (2013.01); G06K 7/10316 (2013.01); G06K 7/10356 (2013.01); G06K 19/07777 (2013.01); G06Q 10/087 (2013.01); H01Q 1/2216 (2013.01)

(58) Field of Classification Search
CPC ... B07C 3/10; G06K 7/10386; G06K 7/10356
See application file for complete search history.

(56) References Cited

U.S. PATENT DOCUMENTS

| | | | | |
|---|---|---|---|---|
| 6,204,764 B1 * | 3/2001 | Maloney | ................ | G06K 17/00 340/568.1 |
| 6,232,870 B1 * | 5/2001 | Garber | ................ | G06K 7/0008 340/10.1 |
| 6,707,381 B1 * | 3/2004 | Maloney | ............ | G07C 9/00103 340/568.1 |
| 6,714,121 B1 * | 3/2004 | Moore | ............... | G06K 7/10336 340/10.3 |
| 7,252,230 B1 * | 8/2007 | Sheikh | ................ | G06Q 10/087 235/439 |
| 7,336,174 B1 * | 2/2008 | Maloney | ............ | G08B 13/1427 340/568.1 |

(Continued)

Primary Examiner — Thomas Randazzo
(74) Attorney, Agent, or Firm — Patterson + Sheridan, LLP

(57) ABSTRACT

Embodiments herein describe a package management system that uses two operation modes of RFID readers (i.e., an inventory mode and a search mode) to provide feedback to an associate when a package has been mis-sorted. In one embodiment, the RFID readers are attached to one or more RFID antennas which each are disposed overhead a respective container or storage location in a warehouse. For example, each of the antennas may have a beam pattern or read region that covers the container. Using the RFID antennas, the RFID reader can query the RFID tags in the container to identify the packages stored in the container. In one embodiment, the RFID reader switches to the search mode after a new package is identified. Using the search mode, the RFID reader can quickly identify when the package is stored in the container and provide prompt feedback to the associate.

20 Claims, 6 Drawing Sheets

(56) References Cited

U.S. PATENT DOCUMENTS

| | | | | |
|---|---|---|---|---|
| 7,588,185 | B2* | 9/2009 | Berquist | G06K 7/0008 235/383 |
| 7,710,275 | B2* | 5/2010 | Phillips | G06K 7/10316 340/572.8 |
| 7,711,515 | B2* | 5/2010 | Burdett | G01K 1/02 340/584 |
| 8,120,495 | B2* | 2/2012 | Fukuda | H01Q 1/2216 340/10.1 |
| 8,159,350 | B2* | 4/2012 | Bauchot | G06K 7/0008 340/572.7 |
| 8,301,294 | B1* | 10/2012 | Shakes | B07C 5/38 209/583 |
| 8,466,792 | B2* | 6/2013 | Svalesen | G06K 17/0022 340/572.8 |
| 8,730,044 | B2* | 5/2014 | Campero | G06K 7/0008 340/572.1 |
| 9,665,848 | B1* | 5/2017 | Johnson | G06Q 10/087 |
| 10,034,400 | B2* | 7/2018 | Rahim | G06K 7/10356 |
| 2004/0036595 | A1* | 2/2004 | Kenny | G08B 13/1427 340/505 |
| 2010/0164694 | A1* | 7/2010 | Matsubara | G06Q 10/087 340/10.42 |
| 2010/0171595 | A1* | 7/2010 | Fujino | G06K 7/0008 340/10.2 |
| 2012/0119883 | A1* | 5/2012 | Bekritsky | G06K 7/0008 340/10.4 |
| 2012/0161967 | A1* | 6/2012 | Stern | G06Q 10/087 340/572.1 |

* cited by examiner

OVERHEAD RFID ANTENNA

BACKGROUND

Shipping warehouses can use radio frequency identification (RFID) systems to track inventory. RFID tags, which can be passive or active, are disposed on the inventory (e.g., individual packages or pallets) in the warehouse and are programmed with information identifying the associated inventory. The identifying information is read from the RFID tags by RFID readers. In one example, the RFID readers are located at loading docks or along conveyor belts so that the RFID system can detect when RFID tags (and the corresponding inventory) pass through.

In other examples, RFID systems are disposed over containers or storage areas where packages are being stowed. Identifying and tracking all the packages in the containers, however, can be slow. That is, as the number of packages in a container increases, the amount of time required to inventorize (i.e., identify all the packages in the container) also increases. Tracking the packages to ensure the packages are in the correct container can take too long, and a result, the RFID system may be unable to provide prompt feedback to an agent stowing the packages.

BRIEF DESCRIPTION OF DRAWINGS

Various embodiments in accordance with the present disclosure will be described with reference to the drawings, where like designations denote like elements.

DETAILED DESCRIPTION

Embodiments described herein provide a package management system that uses two operation modes of RFID readers to provide feedback to an agent when a package has been mis-sorted. In one embodiment, the RFID readers are attached to one or more RFID antennas which each are disposed overhead a respective container or storage location in a warehouse. For example, each of the antennas may have a read region that covers a container (e.g., a pallet box), a respective staging location, or a sorting area. Using a RFID antenna, a RFID reader can query the RFID tags in its assigned container or location to identify the packages in the container.

However, inventorying the packages in a container using an inventory mode when each container can contain hundreds of packages can take a long time (e.g., several seconds). As such, by the time the RFID reader determines an agent has mis-sorted a package (i.e., placed the package in the wrong container), the agent may have walked away from the container to pick up another package. Providing feedback promptly (e.g., before the agent has picked up another package to stow) can reduce mis-sort errors.

In one embodiment, the RFID reader uses a search mode to track a package being carried by the agent which can require only a fraction of the time when compared to using the inventory mode which identifies all the packages in the read region of the RFID antenna. The RFID reader may switch from the inventory mode to the search mode after a new package is identified. For instance, the read region of the RFID antenna may include the area around the container. Thus, when an agent carrying a package approaches the container, the RFID reader can detect the new package using the inventory mode and switch to the search mode. Using the search mode, the RFID reader can quickly identify whether the package remains in the read region of the RFID antenna for a predefined period of time (e.g., more than a second) or for a predefined number of read cycles. If so, the RFID reader determines that the package is stowed in the container. In response, an inventory tracking system can determine whether the container is the correct or desired location of the package. If not, the inventory tracking system can use a feedback device to alert the agent that the package was mis-sorted who can then remove the package and stow it in the correct container.

Figure 1:
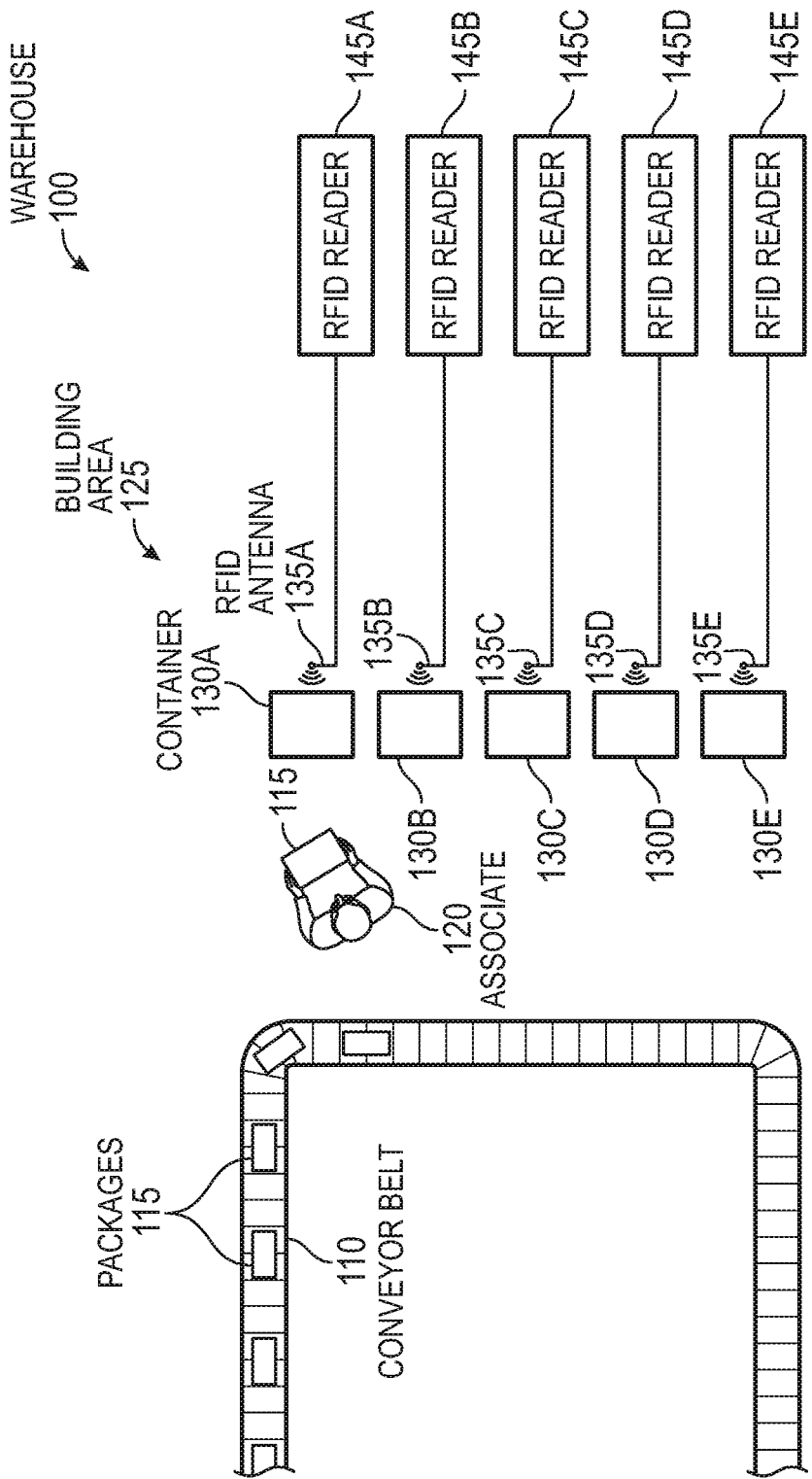
FIG. 1 illustrates multiple RFID antennas and RFID readers for tracking packages at corresponding containers, according to various embodiments.

FIG. 1 illustrates multiple RFID antennas 135 and RFID readers 145 for tracking packages 115 at corresponding containers 130, according to various embodiments. A conveyor belt 110 carries packages 115 to different parts of the warehouse 100. During sorting, an agent 120 picks up one of the packages 115 from the conveyor belt 110 and carries the package 115 to a building area 125 which has several containers 130 for storing the packages 115 according to a sorting criteria. In one example, the sorting criteria may include the geographic region of a mailing address (or destination of the packages 115). The agent 120 may look at a postal code on a shipping label on the package 115 to identify which container 130 she should place the package 115 in. In another example, the sorting criteria may be a particular shipping company assigned to deliver the packages 115 to their destinations. For example, each of the containers 130 may correspond to a different shipping company. A visual mark on the package 115 can inform the agent 120 which of the containers 130 should store the package 115.

The containers 130 can be any suitable apparatus with a form factor for holding multiple shipping packages 115—e.g., a pallet, a pallet box, bag, bin, etc. Moreover, although a container 130 is shown, the packages 115 may be placed in a defined region—e.g., a staging area—on the floor of the warehouse 100 rather than being placed in a container 130. For example, tape or paint may be used to define the boundaries of the staging areas which the agent 120 can use to place the package 115 in the correct region. As used herein, a "package storage region" can include a defined region—e.g., a staging area—or a container 130 that has a form factor for storing multiple packages 115.

The agent 120, however, can mis-sort a package when moving the packages 115 from the conveyor belt 110 to the appropriate container 130. For example, the agent 120 may misread the shipping label or forget which container is associated with which postal code. The mis-sorted packages may be mailed to the wrong location which can delay the delivery date to the customer and incur additional costs to rectify. To mitigate mis-sorting, the warehouse 100 includes the RFID antennas 135 and the RFID readers 145 to detect and rectify mis-sorted packages 115 before the packages 115 can leave the warehouse 100.

In one embodiment, the RFID antennas 135 are positioned or adjusted such that their corresponding read regions (also referred to as radiation patterns, beam patterns, or read zones) cover one of the containers 130. To ensure the RFID antennas 135 can detect packages regardless of where those packages are in the container 130, the beam pattern may extend to the region surrounding the containers 130 (e.g., less than a meter). Nonetheless, in one embodiment, the RFID antennas are positioned such that the beam pattern does not cover a neighboring container 130. That is, the beam pattern of the RFID antenna 135A may cover container 130A (and its surrounding area) but not container 130B. Thus, when active, the RFID antenna 135A transmits and receives signals for identifying RFID tags in the container 130A but would not detect RFID tags disposed in container 130B (or any of the other containers). Nonetheless, the beam patterns for the RFID antenna 135A and antenna 135B may overlap in the area between the containers 130A and 130B. Thus, if the agent 120 was holding the package 115 in this region, both of the RFID readers 145A and 145B would detect the RFID tag on the package 115.

To control the read regions such that they cover only a desired container 130 (or region), in one embodiment, the RFID antennas 135 are disposed a set height overhead the containers 130 (e.g., 2-3 meters). In one embodiment, the RFID antennas 135 are set at least 2.4 meters (e.g., around 8 feet) above the containers 130 since some pallet boxes can be 2.1 meters tall (e.g., around 7 feet). Moreover, the antennas 135 may have a narrow beam width such that the emitted radiation strikes only the container 130 (or the area immediately around the container 130). Further, the power can be controlled to prevent the read regions of the RFID antennas 135 from extending to neighboring containers 130. By adjusting or controlling these factors, the containers 130 can be spaced close to each other (e.g., within a few feet) but still have confined beam patterns so that the RFID antennas 135 can identify only the tags that are disposed in their assigned containers 130 or the immediate vicinity.

The antennas 135 have a polarization which permits them to receive RFID signals regardless of the orientation of the RFID tags in the containers 130. That is, when stowed in the containers, the RFID tags (which are typically linearly polarized) may have different orientations. As such, the RFID antennas 135 may have multilinear polarizations or be circularly polarized to communicate with the RFID tags regardless of the orientation of the packages and tags in the containers 130.

Although FIG. 1 illustrates a one-to-one relationship between the containers 130 and the RFID antennas 135, in another embodiment, the antennas 135 can be coupled to a actuators such that they can be moved to cover different containers 130 (e.g., one antenna 135 can effectively cover multiple containers 130 by moving or pivoting an antenna 135 such that its read region covers the desired container 130). In addition, FIG. 1 illustrates a one-to-one relationship between the RFID antennas 135 and the RFID readers 145. However, in other embodiments, the RFID readers 145 may be coupled to two, three, four, or more of the RFID antennas 135. For example, the RFID readers 145 may have multiple ports for coupling multiple RFID antennas 135 to the same reader, or selection logic may be disposed between multiple RFID antennas 135 and a shared RFID reader 145 to couple one of the antennas 135 to the shared RFID reader 145. Although the RFID reader 145 can be coupled to multiple antennas 135, the RFID reader 145 transmits and receives RFID signals on only one of the RFID antennas 135 at any given time.

However, the number of RFID antennas 135 that can be coupled to an RFID reader 145 may be limited by the number of packages 115 that can be potentially stored in the containers 130. For example, four RFID antennas 135 may be coupled to the same RFID reader 145 to inventorize the packages 115 in four of the containers 130. However, as the number of stowed packages 115 in the containers 130 increases, the ability of the RFID reader 145 to identify the packages 115 in the containers 130 and provide prompt feedback to the agent 120 decreases. If the containers 130 each contain hundreds of packages 115, then an RFID reader 145 may be coupled to only one or two of the RFID antennas 135 even though the RFID reader 145 may have four ports—i.e., two of the ports are unused—so that prompt feedback can be given to the agent 120 regardless of the number of packages in the containers 130.

Although the RFID readers 145 may be coupled to only one RFID antenna 135 at a time, the RFID readers 145 can use time multiplexing to read from multiple antennas 135 using a plurality of time periods. For example, the RFID reader 145 may drive and receive RFID signals using the RFID antenna 135A for a first time period, drive and receive RFID signals using the RFID antenna 135B for a second time period, drive and receive RFID signals using the RFID antenna 135C for a third time period and then repeat the three time periods.

In one embodiment, the RFID readers 145 switch from the inventory mode to the search mode in response to detecting a new package within the beam pattern of the corresponding RFID antenna 135. That is, when operating in the inventory mode, the RFID reader 145 detects a RFID tag with an ID that was not previously detected (e.g., the agent 120 has moved the RFID tag and package 115 into the read region of the RFID antenna 135). The RFID reader 145 switches to the search mode and uses the ID to track the new package in the read region of the RFID antenna 135. If the package stays in the read region for a predefined period of time (e.g., at least a second) or for a predefined number of read cycles, the RFID reader 145 determines that the package is stored in the assigned container 130 and notifies an inventory tracking system which can use a feedback device to inform the agent 120 whether the package was placed in the correct container 130. Using the search mode permits the RFID reader 145 to track the package quicker than relying on the inventory mode which means that the RFID reader 145 can track the package with more granularity to determine whether the package 115 is stored in the container 130 or the agent 120 moved the package 115 outside of the read region of the RFID antenna 135.

Figure 2:
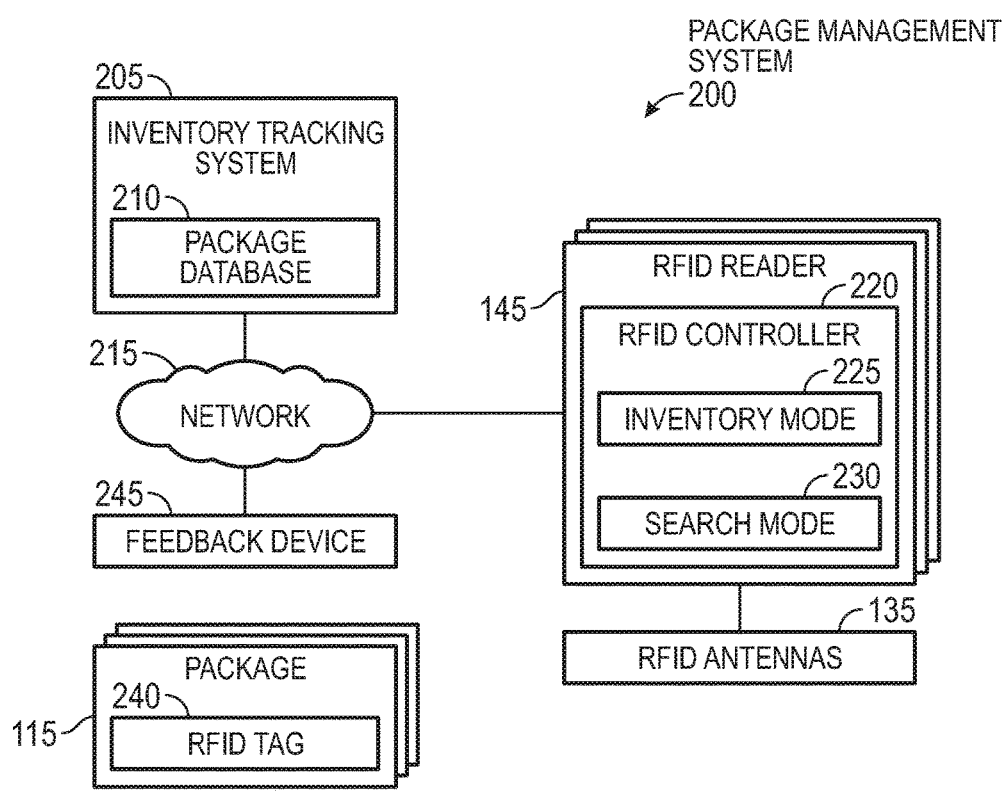
FIG. 2 illustrates a package management system for tracking packages in a warehouse, according to various embodiments.

FIG. 2 illustrates a package management system 200 for tracking packages in a warehouse, according to various embodiments. The package management system 200 includes an inventory tracking system 205, the RFID readers 145, the RFID antennas 135, a feedback device 245, the packages 115, and a network 215.

The inventory tracking system 205 includes a package database 210 which stores information concerning the packages 115 in the warehouse (or a network of warehouses). For example, the package database 210 may map each package in the warehouse to a unique tag ID. When an RFID tag 240 is placed on the package 115, the inventory tracking system 205 can update the package database 210 to assign the ID of the RFID tag 240 as the unique ID of the package 115. Using the information provided by the RFID readers 145, the package database 210 can also indicate the location the package 115 in the warehouse when the package 115 is stowed in one of the containers 130 shown in FIG. 1.

In one embodiment, the inventory tracking system 205 includes one or more computing device disposed in the warehouse. Alternatively, the inventory tracking system 205 may be hosted by remote computing devices in a data center or a cloud computing environment. As shown, the package management system 200 includes the network 215 for communicatively coupling the various components using wired or wireless means. The network 215 can be a local access network (LAN) or a wide-area network (WAN) such as the Internet.

The RFID reader 145 includes an RFID controller 220 which can switch a mode of operation of the RFID reader 145 between the inventory mode 225 and the search mode 230. As described above, when in the inventory mode 225, the RFID reader 145 attempts to transmit and receive responses from all the tags in the read region of one of the RFID antennas 135. One example of the inventory mode 225 is that the RFID reader 145 transmits an RFID signal (e.g., a Query command) instructing the RFID tags 240 within the read region to set respective counters to random values between zero and a maximum number (e.g., 256) which is adjustable. In one embodiment, the RFID reader 145 transmits a Q-parameter which ranges from 0-15 to specify the range of the random values. The tags 240 pick a random number between 0 and $2^Q-1$ for initializing their respective counters. During each query, the RFID tags 240 decrement their counts until their counts reach zero. At that point, the RFID tags 240 can reply to the RFID signal transmitted by the RFID reader 145 by transmitting their ID. By using random counter values, the RFID tags 240 can reduce collisions. If two or more tags 240 respond to the same query (i.e., the counters on two tags 240 are at zero) and there is a collision, the RFID reader 145 sends a negative acknowledgment which tells the tags 240 to wait for another query until they respond again.

In contrast, when operating in the search mode 230, the RFID reader 145 uses a known ID to determine if a specific RFID tag 240 and package are in the read region. In one embodiment, when in the search mode 230, the RFID reader 145 transmits a RFID instruction which is ignored by all the RFID tags 240 except the tag 240 that has the same ID as the ID included in the instruction. For example, the RFID controller 220 saves the ID for the new package that was identified when operating in the inventory mode 225 and uses that ID when in the search mode 230 to determine if a RFID tag 240 with that ID is still in the read region of the RFID antenna 135.

Alternatively, when in the search mode 230, the RFID reader 145 can perform a similar operation as when in the inventory mode 225 where the reader 145 sends an RFID signal instructing the RFID tags 240 to set random values in their counters and uses a plurality of queries to decrement the counters until the RFID tag with the ID of the new package 115 responds. Once the tag 240 on the new package 115 responds, the RFID reader 145 stops the read cycle and may repeat the process—i.e., send another RFID signal instruction the RFID tags to again set random values in their counters. This implementation of the search mode 230, however, may be slower that transmitting a targeted RFID instruction since the number of queries needed to detect the new package 115 depends on the random value of the counter in the corresponding RFID tag 240. That is, the time used to identify the new package 115 various according to the random value of the counter on the RFID tag 240 that the reader is searching for.

In one embodiment, each of the RFID readers 145 includes a respective RFID controller 220 which can be a software application, firmware, hardware, or combinations thereof. The RFID controllers 220 may operate independently of each other but can communicate to track packages that may move between the read regions of the RFID antennas 135. For example, if a first RFID controller 220 determines a previously identified package has left the read region of an RFID antenna 135, the first RFID controller 220 can inform a second RFID controller 220 on a neighboring RFID reader 145 (e.g., a RFID reader coupled to antenna 135 with a directly adjacent or overlapping read region) to search for the package. For example, the first RFID controller 220 may provide the package ID to the second RFID controller 220 which switches to the search mode 230 to search for the package in its corresponding read region.

In another embodiment, instead of individual RFID controllers 220, the package management system 200 may include a central RFID controller (which could be located on one of the RFID readers 145, the inventory tracking system 205, or a separate computing system) that manages all of the RFID readers 145. The central RFID controller may set the operating modes for each of the RFID readers 145. For example, if a first RFID reader 145 detects a new package 115, the central RFID controller may change the operation state of the first RFID reader 145 as well as its neighboring RFID readers 145 to the search mode 230 to track the newly identified package 115.

The feedback device 245 can be any visual, audio, or haptic device that can provide feedback to the agent. For example, the feedback device 245 may be a display which displays messages to the agent, a speaker which outputs audio instructions or commands, or a vibration motor. If the agent correctly stows the package 115, the inventory tracking system 205 can using the feedback device 245 to inform the agent who can then proceed to return to the conveyor belt and retrieve a different package 115. If the package was stowed in the wrong container, the inventory tracking system 205 can alert the agent using the feedback device 245.

In one embodiment, the feedback device 245 is worn on, or carried by, the agent. For example, the device 245 may be an electronic watch, a mobile phone or tablet, a vest, pager, and the like. Alternatively, the feedback device 245 may be mounted or disposed at a stationary location in the warehouse. For instance, the feedback device 245 may be a light or display device mounted over each of the containers. If the agent placed a package in the correct container, the light or display device may output a positive color (e.g., green). If the container is not the correct location of the package, the light or display device may output a different color (e.g., red).

Figure 3:
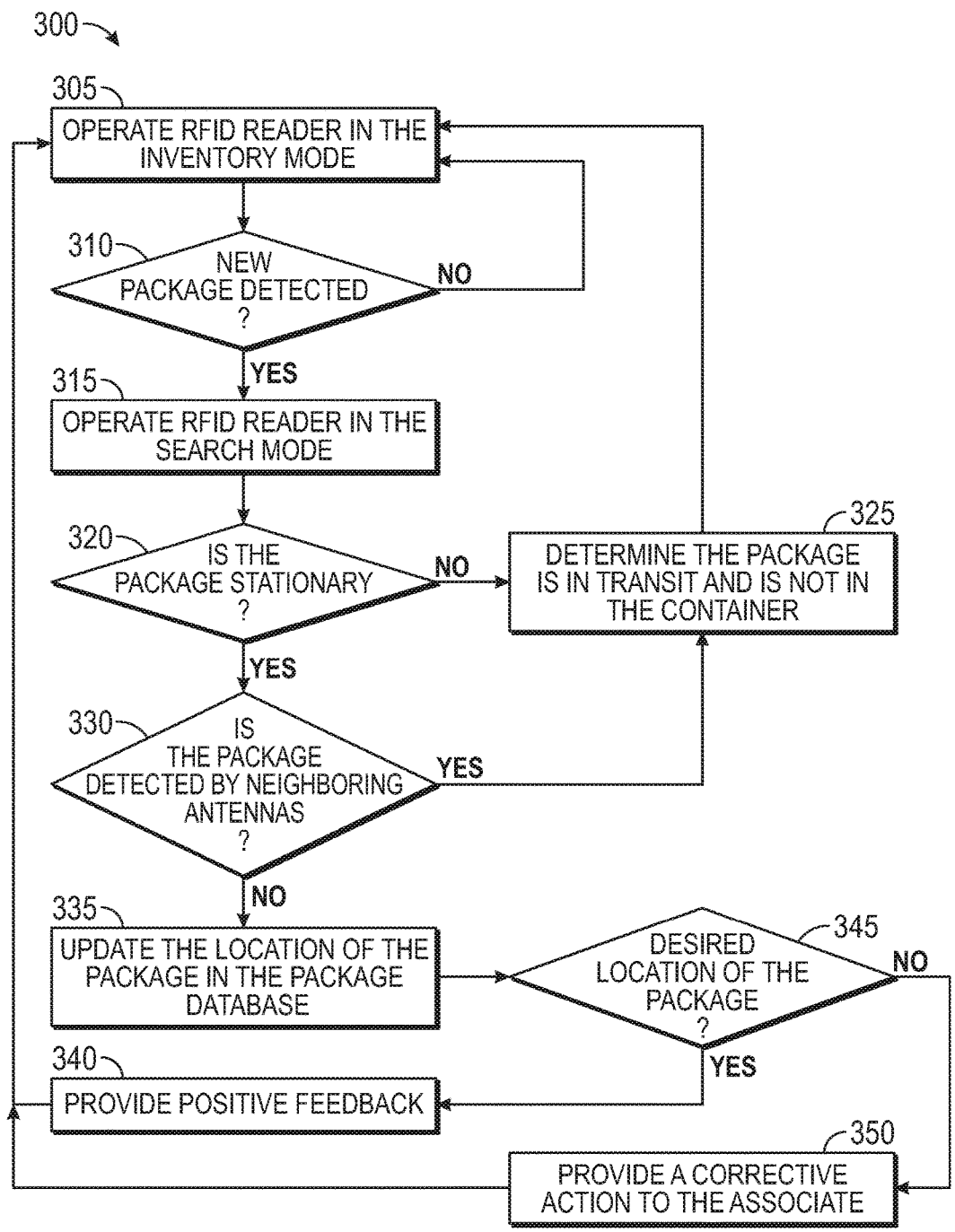
FIG. 3 is a flowchart for switching an RFID reader from an inventory mode to a search mode to track a package, according to various embodiments.

FIG. 3 is a flowchart of a method 300 for switching an RFID reader from inventory mode to search mode to track a package, according to various embodiments. At block 305, the RFID controller operates an RFID reader in the inventory mode. As described above, in the inventory mode the RFID reader attempts to identify the RFID tags within the read region of the RFID antenna. In one embodiment, the read region covers a container or storage area in the warehouse and may cover the surrounding area (e.g., the area within a meter around the container). In this manner, the RFID reader can detect tags as an agent carrying a package approaches a container before the agent has placed the package into the container.

At block 310, the RFID reader determines whether a new package was identified when operating in the inventory mode. For example, after identifying all the packages, the RFID controller can compare the list of detected IDs of the packages to a list of IDs detected previously. In one embodiment, the RFID controller maintains an inventory list that includes all the packages in the container. Alternatively, the RFID controller can provide the list of identified IDs to the package database in the inventory management system which determines whether a new package is within the read region of the RFID antenna coupled to the RFID reader.

If the list of identified IDs does not indicate a new package has moved into the read region of the RFID reader, the method 300 returns to block 305. However, if a new package was detected, the method 300 proceeds to block 315 where the RFID controller operates the RFID reader in the search mode. Instead of identifying all the packages in the read region, the RFID reader uses the ID corresponding to the newly identified package to operate in the search mode. That is, during block 315, the RFID controller determines whether the new package remains within the read region of the RFID reader. As mentioned above, the search mode may include transmitting an RFID signal that includes the ID of the new package to which only the RFID tag on the new package will response or using a technique similar to the inventory mode but stopping the query once the RFID tag on the new package responds.

At block 320, the RFID controller determines whether the new package is stationary. Stated differently, the RFID controller determines whether the package has been placed in the container covered by the read region of the RFID reader. In one embodiment, the RFID controller determines the new package is stationary if the package remains in the read region for a predefined time period or for a predefined number of read cycles. For example, the RFID controller may indicate the new package is stowed in the container if for a predefined time period (e.g., one second) each time the RFID reader transmits an RFID signal or query to the RFID tag on the new package, the tag responds. Or the RFID controller may require the RFID tag on the new package to reply to a predefined number of successive RFID read cycles when operating in the search mode before determining the new package is stationary.

In another embodiment, the RFID controller monitors a position of the RFID tag in the read region to determine whether the new package is stationary. For example, the RFID controller can use RSSI to measure a distance between the RFID antenna and the RFID tag. If the RSSI remains substantially constant for a predefined period of time, the RFID controller may determine that the package is stationary. However, if the RSSI changes by a set threshold (e.g., more than 5%) between two read cycles, the RFID controller determines the package is in transit.

Furthermore, if the package is in a portion of the read region that overlaps with a read region of one or more neighboring RFID antennas, then the RSSI can be measured using a plurality of RFID readers and a more accurate location of the package can be identified. That is, while method 300 describes a process for one of the RFID readers, multiple RFID readers may detect the same new package, and thus, switch to the search mode at block 315 since their read regions may overlap. The RSSI measurements acquired by the multiple RFID readers can be combined (e.g., using trilateration techniques) to identify a specific location of the package in the warehouse. As the RFID readers continue to operate in the search mode and receive updated RSSI data, the RFID controller can determine based on the updated RSSI data whether the package has moved from a previous location. In this manner, the RFID controller can track the location of the package over a period of time thereby determining if the package is stationary or in transit (i.e., still being carried by the agent). In one embodiment, the RFID controller requires the location of the package (or the RSSI) to remain substantially unchanged for a predetermined period of time before determining the package is stowed in the container since the agent may be holding the package at a stationary location temporary while she determines which container is the correct container.

If the package leaves the read region of RFID reader (e.g., the RFID tag does not respond to a query from the RFID reader when operating in the search mode) or the location of the package is moving within the read region as indicated by monitoring the RSSI, the RFID controller determines the package is in transit at block 325. As such, the RFID controller determines the package has not been placed in the container and the new package is not added to the list of inventory for the container. The method 300 then returns to block 305 where the RFID controller switches the operational mode of the RFID reader to the inventory mode to inventorize the packages in the container.

If the new package is again detected at block 310, the method 300 proceeds to blocks 315 and 320 where the RFID controller switches to the search mode and determines whether the package (which was previously in transit) is now stationary. Put differently, although the package was previously detected, it was never added to the inventory list since the package was not stationary. Thus, when the method 300 returns to blocks 305 and 310, the package is still identified as a "new" package since the package is not in the inventory list for the container. In this manner, the RFID controller can continue to monitor the packages in the read region until those packages either become stationary (i.e., are placed in the container) or leave the read region.

If at block 320 the RFID controller determines the package is stationary, the method 300 proceeds to block 330 where the RFID controller determines whether the package is detected by neighboring antennas. Performing block 330 may be especially helpful when the read regions of the antennas do not cover the neighboring containers. That is, although the read regions for neighboring RFID readers may overlap in an area between the containers, the read regions do not cover neighboring containers. Thus, block 330 may be used to confirm that a package is stored in a container, rather than being held by an agent in a region outside of the containers which may be covered by a neighboring antenna. Put differently, although the RFID controller has determined the package is stationary in the read region, block 330 can be used to ensure the package has been stored in a container. Thus, performing block 330 may permit the RFID controller to use shorter time thresholds or few read cycles at block 320 when determining whether the package is stationary since block 330 ensures the package is detected by only one RFID readers, and thus, is stowed within the container. However, block 330 may be omitted if the read regions of the RFID antennas do cover neighboring containers. In that case, the RSSI measurements captured by the neighboring RFID antennas can be used to triangulate a location of the package as described above to determine whether the package is in the container or still being held by the agent.

If any one of the neighboring RFID readers detects the package, the method 300 proceeds to block 325 since the package has not yet been stowed in the container. However, if the neighboring RFID readers do not detect the package, the method 300 proceeds to block 335 where the inventory tracking system updates the location of the package in the package database to indicate the package is in the container assigned to the RFID reader. At block 345, the inventory tracking system determines whether the agent stowed the package in the desired container. That is, the RFID reader can indicate to the inventory tracking system that the ID corresponding to the package was detected in the container assigned to the RFID reader. Using the package database, the inventory tracking system can determine whether the associate placed the package in the correct container. For example, the package database may store the desired shipping destination of the package. The inventory tracking system can ensure the package is in the container corresponding to the postal code of the destination of the package or to a third-party shipping company assigned to deliver the package.

If so, the method 300 proceeds to block 340 where the inventory tracking system provides positive feedback to the agent using the feedback device. For example, the feedback device may include a display which turns green indicating the package was sorted correctly or a speaker may output a ding. In this manner, the agent knows the task was completed successfully and she can return to a pick-up area (e.g., a conveyor belt) and retrieve a different package. The method 300 then returns to block 305 where the RFID reader remains in the inventory mode until a new package is detected.

If at block 345 the inventory tracking system determines the agent placed the package in the wrong location, the method 300 proceeds to block 350 where the inventory tracking system instructs the feedback device to provide an action for the agent. For example, the inventory tracking system may instruct the feedback device to vibrate indicating to the agent she should retrieve the most recently stowed package. If the feedback device includes a display or a speaker, the inventory tracking system can output a message instructing the agent which of the containers should contain the package.

In one embodiment, the method 300 operates fast enough that the inventory tracking system can provide feedback to the agent before she returns to the pick-up region to retrieve another package. In one embodiment, the method 300 can provide feedback to the agent within less than a second from when the RFID reader detects the new package at block 310. The agent can correct any mis-sorts before she returns to pick up another package.

In one embodiment, after providing the action to the agent, the method 300 returns to block 305 and the method repeats. That is, the method 300 can verify that the agent has corrected the mis-sort. For example, when the agent carries the removed package to a new container, the RFID reader detects the new package and switches to the search mode to determine when the package is stowed in its assigned container as described above.

Figure 4:
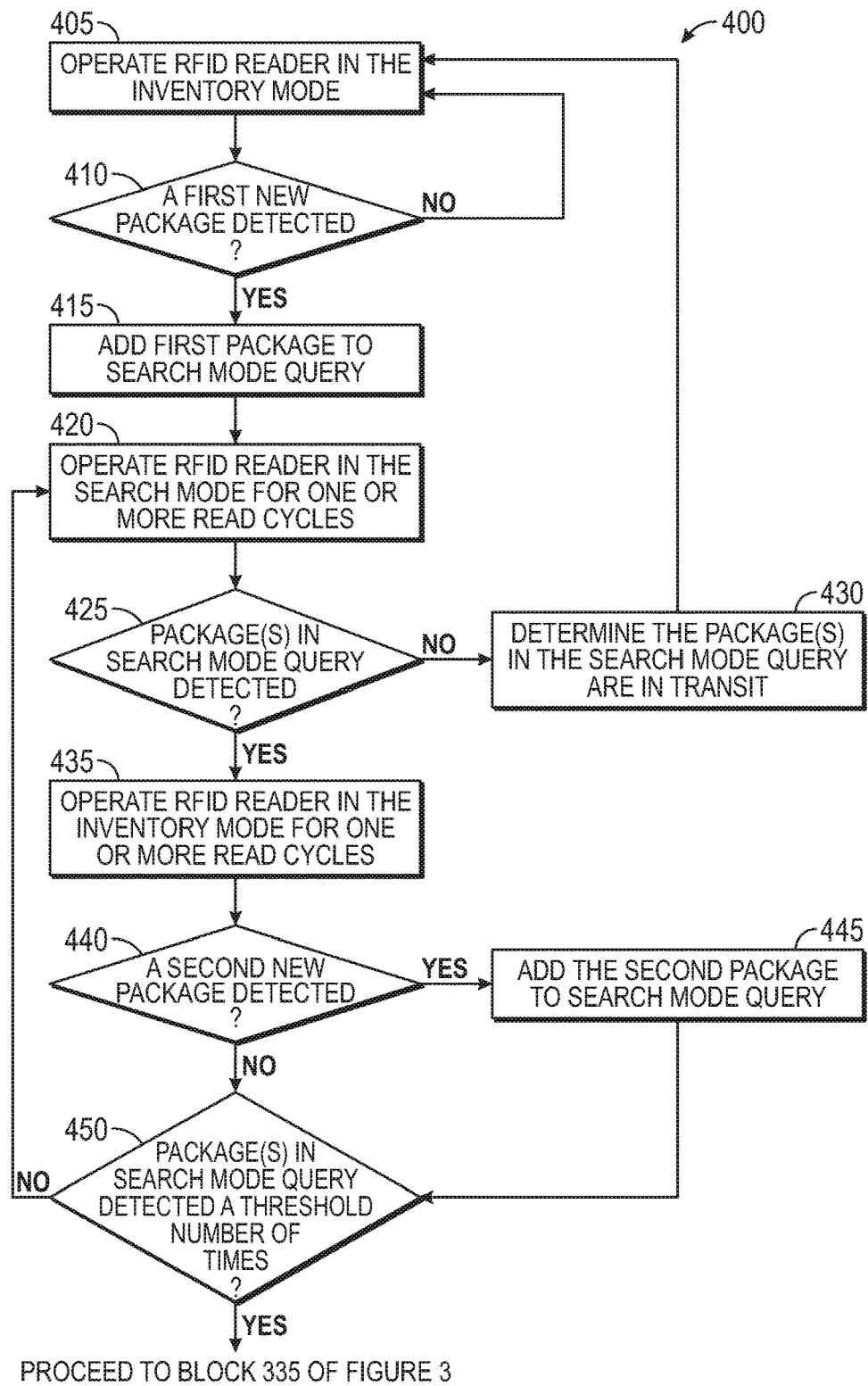
FIG. 4 is a flowchart for switching an RFID reader from the inventory mode to the search mode to track a package, according to various embodiments.

FIG. 4 is a flowchart of a method 400 for switching an RFID reader from inventory mode to search mode to track a package, according to various embodiments. Like in the method 300, the method 400 begins at block 405 where the RFID controller operates the RFID reader in the inventory mode. If at block 410, the RFID controller detects a first new package when using the inventory mode, the method 400 proceeds to block 415 where the RFID controller adds the first package to a search mode query which includes a list of specific IDs that are searched for when the RFID reader operates in the search mode. If the search mode query includes multiple IDs, the RFID reader may use different read cycles when in the search mode to determine if the IDs are within the read region.

At block 420, the RFID controller operates the RFID reader in the search mode for one or more read cycles. For example, if the search mode query includes only one ID (e.g., the ID for the first new package), then the RFID controller may perform only one read cycle at block 420. However, if the search mode query includes multiple IDs, then the RFID controller may perform a read cycle for each of the IDs. As described above, the read cycle may include the modified inventory mode where the RFID reader stops once the RFID tag replies with the ID identified (at block 410), or a targeted RFID query where only the tag on the first package responds.

In one embodiment, at block 420, the RFID controller may perform multiple read cycles for each of the packages listed in the search mode query. That is, if the search mode query only includes the first package, the RFID controller may nonetheless perform multiple successive read cycles over a predefined period of time to track the first package and ensure the package remains in the read region for that period of time.

At block 425, the RFID controller determines whether the first package or in the search mode query was detected when operating in the search mode. If not, the method 400 proceeds to block 430 where the RFID controller determines the first package is in transit. That is, because the package has left the read region, the RFID controller determines the agent is moving the package to a different container and switches the RFID reader back to the inventory mode at block 405.

However, if the package or packages in the search mode query are detected at block 425, the method 400 proceeds to block 435 where the RFID controller operates the RFID reader in the inventory mode for one or more read cycles. That is, after detecting a new package, the RFID controller switches the RFID reader between the search mode (to track the new package) and the inventory mode (to inventorize the packages in the container). One advantage of switching between the modes is that during the inventory mode the RFID controller can determine if another new package has entered the read region. If the RFID reader remains in the search mode for an extended period of time (e.g., a second), the RFID controller may miss a second agent who brings another package into the read region since in the search mode that RFID reader searches only for previously identified packages. Thus, by repeatedly switching between the inventory and search modes, the RFID controller can track multiple new packages that enter into the reader region.

Figure 5:
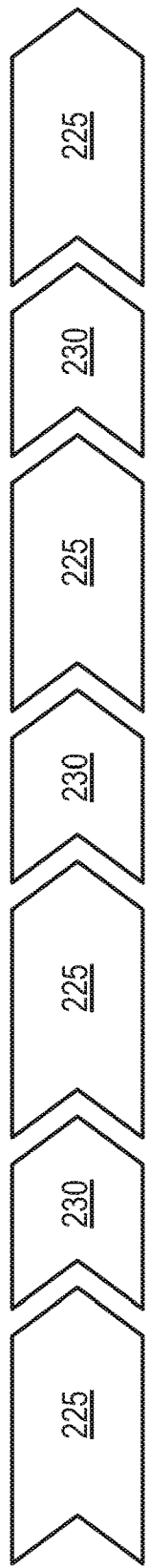
FIG. 5 illustrates time multiplexing an RFID reader between the inventory and search modes, according to various embodiments.

FIG. 5 illustrates time multiplexing an RFID reader between the inventory mode 225 and the search mode 230, according to various embodiments. In FIG. 5, each block or time slot may represent a time period that the RFID reader performs either one read cycle or multiple successive read cycles for each mode. For example, during the first time slot, the RFID reader performs one read cycle in the inventory mode 225 during which the RFID reader identifies all the packages in the read region. During the second time slot, the RFID reader performs one read cycle in the search mode 230 (which can be more than a magnitude shorter than a read cycle in the inventory mode 225) to determine if a particular package is within the read region. In one embodiment, each read cycle in the search mode identifies one package. Thus, if the search mode query includes multiple packages, multiple read cycles are performed during the time slots for the search mode 230. In one embodiment, each of the time slots in FIG. 5 corresponds to performing either block 420 or block 435 in the method 400.

In one embodiment, the durations of the time slots in FIG. 5 are dynamic. For example, as the packages in the containers increase, the time required to inventorize the packages using the inventory mode 225 also increases. Furthermore, the duration of the time slots for the search mode 230 may change depending on the particular technique the RFID readers use to search for the new packages.

Figure 6:
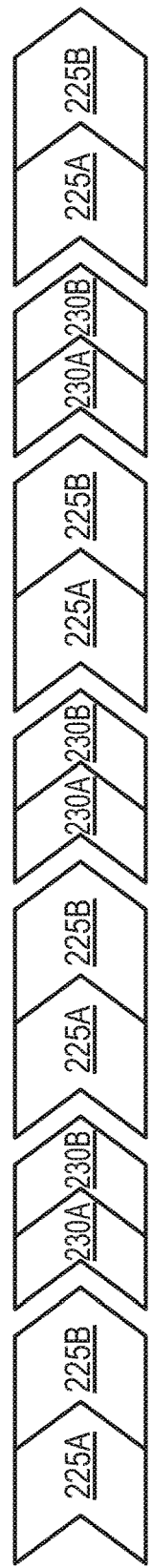
FIG. 6 illustrates time multiplexing an RFID reader coupled to multiple RFID antennas between the inventory and search modes, according to various embodiments.

FIG. 6 illustrates time multiplexing an RFID reader coupled to multiple RFID antennas between the inventory and search modes, according to various embodiments. That is, in FIG. 6, one RFID reader is coupled to two RFID antennas. Thus, each of the blocks can be subdivided between the two antennas. For example, during the first half of the first block, the RFID reader performs a read cycle for the inventory mode 225A using a first RFID antenna. During the second half of the first block, the RFID reader performs a read cycle of the inventory mode 225B using a second RFID antenna. Similarly, during the first half of the second block, the RFID reader performs a read cycle for the search mode 230A using the first RFID antenna and performs a read cycle for the search mode 230B using the second RFID antenna during the second half of the second block. In this manner, the same RFID reader can be time multiplexed to inventorize and perform targeted searches on multiple RFID antennas which can be assigned to different containers using the embodiments described herein.

In another embodiment, the inventory and search modes for each of the antennas are performed in consecutive time periods. For example, instead of performing two consecutive time periods for the inventory mode, the RFID reader may perform one or more read cycles for the first RFID antenna while in the inventory mode 225A and then perform one or more read cycles for the first RFID antenna while in the search mode 230A. The RFID reader may then perform one or more read cycles for the second RFID antenna while in the inventory mode 225B followed by one or more read cycles for the second RFID antenna while in the search mode 230B. This pattern could then repeat.

Returning to the method 400, at block 440, the RFID controller determines whether a second new package was detected when operating in the inventory mode. If so, the method 400 proceeds to block 445 where the RFID controller adds the second package to the search mode query. That is, when operating in the search mode, the RFID reader may use multiple read cycles to determine whether both the first package and the second package remain in the read region.

However, if the RFID reader did not identify a new package at block 440, the method 400 proceeds to block 450 where the RFID controller determines if the packages in the search mode query were detected a threshold number of times. That is, before the RFID controller determines that the packages listed in the search mode query are stored in the container, the controller requires the packages to be detected by the search mode a threshold number of times to ensure the packages were stowed in the container rather than still being in transit. That is, the RFID controller repeatedly switches the RFID reader between the search mode and the inventory mode until the threshold number of times is met.

As shown, if the packages have not been detected a threshold number of times, the method 400 returns to block 420 where the RFID controller again switches the RFID reader to the search mode. If a second new package was detected at block 440, at block 425 the RFID controller determines whether both the first and the second packages remain in the read region. If so, the RFID controller switches the RFID reader to the inventory mode to determine whether another new package has entered the read region.

Once the new packages listed in the search mode query have been detected using the search mode the threshold number of times, the method 400 proceeds to block 335 of FIG. 3. The threshold may be set to ensure that the agent (or agents) has stored the package(s) in the container rather than simply walking by the container. However, when setting the threshold (i.e., the number of times the packages in the search mode query must be detected using the search mode), a system designer may balance between making the threshold long enough to ensure the packages were placed in the container (rather than still being in transit) and the delay caused by the threshold before the inventory tracking system can provide feedback to the agent. That is, although increasing the size of the threshold reduces the chance that the package is still being carried by the agent, it also increases the time before the inventory tracking system provides feedback to the agent. Preferably, the inventory tracking system provides feedback to the agent before the agent has turned to pick up another package.

To help minimize the delay before providing feedback, in one embodiment, the RFID controller may track the RSSI of the packages listed in the search mode query. For example, the RFID controller may use a smaller threshold at block 450 if the controller also monitors for changes in the RSSI each time the RFID reader operates in the search mode to identify the packages in the search mode query. If the RSSI does not change, the RFID controller may repeat blocks 420-450 only two or three times rather than four to six times if the RSSI is not being monitored. Further, in another embodiment, the RFID controller may determine that neighboring RFID antennas cannot detect the packages in the search mode query before proceeding to block 335 of FIG. 3. In addition, if the packages are detected by neighboring RFID readers, the RFID controller can use the RSSI measurements acquired by the neighboring RFID readers to track the location of the packages, and thus, determine if the packages are disposed in the container. Because the various technique may help to ensure the packages in the search mode query are disposed in the container rather than still being in transit, the number of times the method 400 repeats block 425-450 may be reduced so that the inventory tracking system can provide feedback sooner to the agent.

Figure 7:
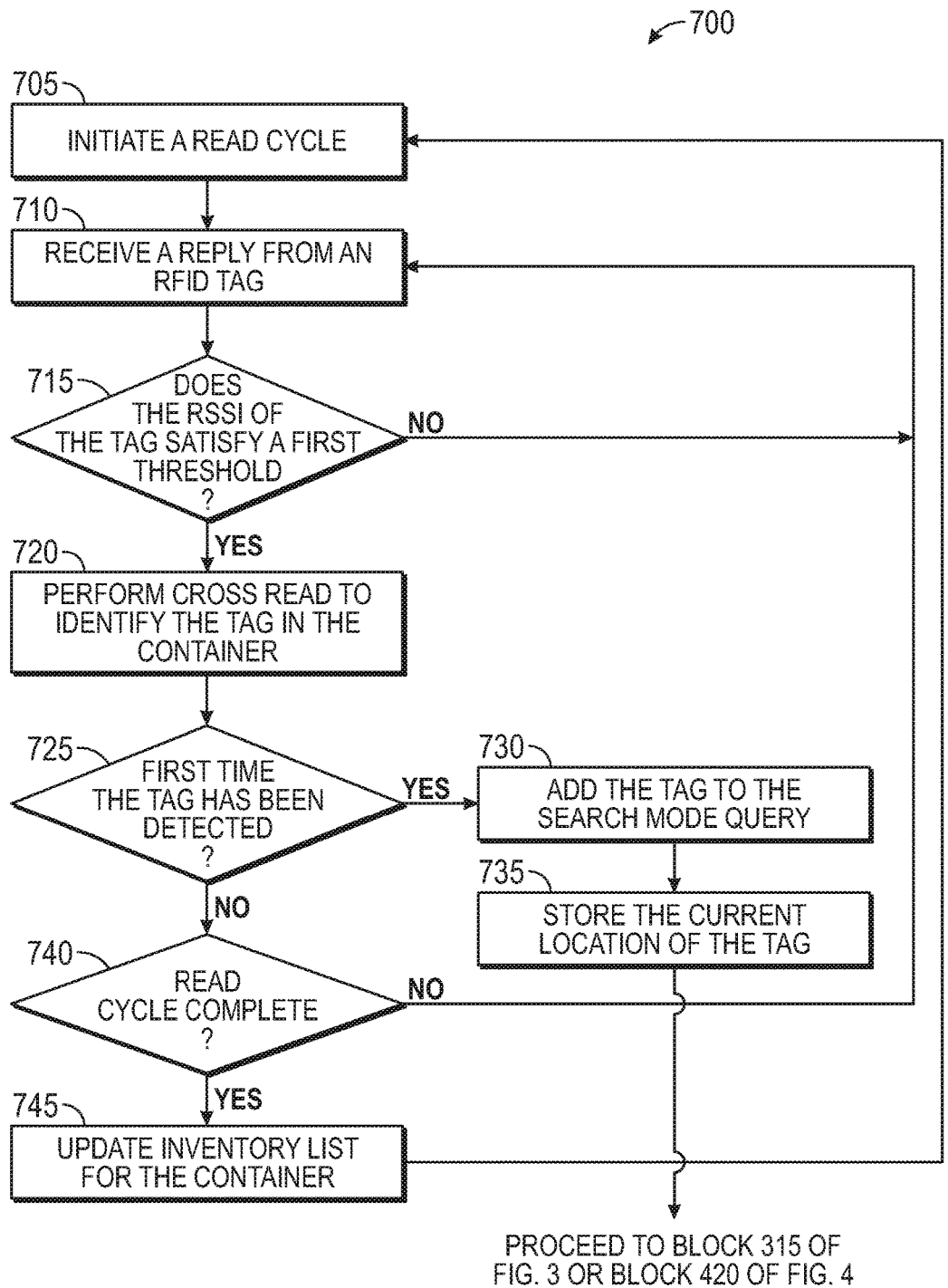
FIG. 7 is a flowchart for determining whether an RFID tag has moved into the read region of an RFID system when in the inventory mode, according to various embodiments.

FIG. 7 is a flowchart of a method 700 for determining whether an RFID tag has moved into the RFID read region, according to various embodiments. In one embodiment, the method 700 is performed to detect when new packages enter the read region as well as identify packages that have been previously placed in the container when operating in the inventory modes in block 305 of FIG. 3 and block 405 of FIG. 4. Put differently, the method 700 provides one example of operating the RFID reader to inventorize the packages in the read region when operating in the inventory mode.

At block 705, the RFID controller initiates a read cycle when operating in the inventory mode. In one embodiment, during each read cycle, the RFID attempts to identify all the packages or tags in the read region using the method 700.

At block 710, the RFID controller receives a reply from one of the RFID tags within the read region. In one embodiment, the RFID controller detects an RFID tag when the controller can successfully decode the modulated signals received from the RFID tag in order to identify the tag ID. As mentioned above, during the read cycle, the RFID reader can transmit multiple RFID queries and decrement a random counter value in the RFID tags to control which of RFID tag replies to a particular query.

At block 715, the RFID controller determines whether the RSSI of the received RFID reply satisfies a first threshold. For example, the RFID controller may determine if the RSSI of the received signal is above a noise floor represented by the first threshold. In one embodiment, the first threshold may be set so that RFID tags located too far from the container (e.g., more than one meter) are ignored. By setting a sufficiently high threshold, the RFID controller can ignore responses from RFID tags in neighboring containers or from tags on packages that are being carried to different containers since the signals are too weak to come from an RFID tag moving around the immediate vicinity of the container.

If the RSSI does not satisfy the first threshold, the method 700 proceeds to block 710 to wait for a reply from another RFID tag. Otherwise, the method 700 proceeds to block 720 where the RFID controller performs a cross read to identify the tag. For example, there may be multiple RFID tags moving in the read region since multiple agents can stow packages in the building area simultaneously. If only one RFID tag is detected, the method 700 can proceed to block 725 without performing further analysis. However, the RFID controller may detect tags that are moving to neighboring containers. To the perspective of the RFID controller, it can appear as if multiple RFID tags are in (or near) its assigned container since the read region can extend to neighboring containers.

The cross read enables the RFID controller to determine whether the tag identified at block 710 is in the immediate vicinity of the container (e.g., within a meter). For example, the RFID controller may compare results from RFID controllers in neighboring RFID readers to determine if those readers also detect the tag. For example, if a neighboring RFID reader also detects the tag, the RFID controller can determine that the tag is not close to its assigned container. However, if the neighboring RFID reader does not detect the tag, the RFID controller determines the tag is within the immediate vicinity of the container.

At block 725, the RFID controller determines if this is the first time the tag has been detected. For example, the RFID controller may query the inventory list of the container to determine whether the package/tag was identified in a previous read cycle. If it is the first time the tag was detected, the method 700 proceeds to block 730 where the RFID controller adds the package corresponding to the tag to the search mode query (e.g., block 410 in FIG. 4). Moreover, at block 735, the inventory tracking system updates the package database to indicate that the package corresponding to the tag was detected in the read region of the RFID reader. In addition, the package database can store other parameters corresponding to the RFID tag such as a transition coefficient, average RSSI, and peak RSSI.

Because a new tag is identified in the read region, the method proceeds to either block 315 of FIG. 3 or block 420 of FIG. 4 where the RFID controller operates the RFID reader in the search mode to determine if the tag is stationary (i.e., is stowed in the container) or still in transit as described above.

If, however, the inventory tracking system indicates the tag has been detected previously at block 725 (i.e., the corresponding package was already in the inventory list for the container), the method 700 proceeds to block 740 where the tag tracker determines whether the read cycle is complete—i.e., whether there are any other tags in the read region. If not, the method returns to block 710 where the RFID controller determines whether there are any remaining RFID tags in the read region.

If the read cycle is complete, the method 700 proceeds to block 745 where the RFID controller updates the inventory list for the container. For example, some of the packages may have been removed from the container by an agent (e.g., the package was mis-sorted) in which case the corresponding package is removed from inventory list. The method 700 then returns to block 705 where a new read cycle begins. In this manner, the RFID reader can continue to operate in the inventory mode until a new package is detected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    reading a first ID from a first RFID tag disposed on a first package using a first RFID antenna and a RFID reader operating in an inventory mode, wherein the first RFID antenna has a read region covering a first container, and wherein, when in the inventory mode, the RFID reader identifies IDs for a plurality of packages in the read region;
    in response to determining that the first package is new to the read region when operating in the inventory mode, repeatedly switching, using an RFID controller, between the inventory mode and a search mode, wherein, when in the search mode, the RFID reader uses the first ID to search for only the first package within the read region;
    determining, using the RFID controller, that the first package is stored in the first container based on the repeated switching;
    determining that a user incorrectly placed the first package in the first container; and
    providing a corrective action to the user via a feedback device.

2. The method of claim 1, wherein repeatedly switching between the inventory mode and the search mode comprises:
    determining, during a first read cycle, that the first package remains in the read region when operating in the search mode;
    reading, during a second read cycle, a second ID from a second RFID tag disposed on a second package when operating in the inventory mode;
    determining that the second package is new to the read region; and
    determining, during multiple read cycles, that the first package and the second package remain in the read region when operating in the search mode.

3. The method of claim 2, further comprising:
    determining that the second package is stored in the first container based on the repeated switching;
    determining that the user correctly placed the second package in the first container; and
    providing positive feedback to the user via the feedback device.

4. The method of claim 1, wherein determining that the first package is stored in the first container comprises:
    determining that the first package is in the read region each time the RFID reader is in the search mode during the repeated switching; and
    determining that the repeated switching has been performed a threshold number of times.

5. The method of claim 1, wherein determining that the first package is stored in the first container comprises:
    reading the first ID of the first package using a second RFID antenna, wherein the second RFID antenna has a read region covering a second container that neighbors the first container; and determining a location of the first package in the read region using information obtained when reading the first ID using the first RFID antenna and the second RFID antenna.

6. The method of claim 5, wherein the first RFID antenna is disposed overhead the first container and the second RFID antenna is disposed overhead the second container, wherein the first and second containers each comprises a form factor for storing multiple packages.

7. A method, comprising:
    determining, using a RFID reader that transmits RFID signals when operating in an inventory mode, that a first package is new to a read region established by a first RFID antenna, wherein the read region covers a first package storage region, and wherein, when in the inventory mode, the RFID reader identifies IDs for a plurality of packages in the read region;
    in response to determining that the first package is new to the read region, determining that the first package remains in the read region using the RFID reader to transmit RFID signals when operating in a search mode, wherein the search mode uses a first ID of an RFID tag on the first package to search for the first package within the read region;
    determining that the first package is stationary in the read region based on information obtained while operating in the search mode; and
    storing data indicating that a location of the first package corresponds to a location of the first package storage region.

8. The method of claim 7, further comprising:
    determining that a second package is new to the read region using the RFID reader operating in the inventory mode;
    determining that the second package is moving in the read region using information obtained when the RFID reader operates in the search mode; and
    determining that the second package is in transit and is not stored in the first package storage region.

9. The method of claim 7, further comprising:
    switching between the inventory mode and the search mode to detect the first package a plurality of times before determining that the first package is stationary in the read region.

10. The method of claim 9, wherein switching between the inventory mode and the search mode comprises:
    determining, during a first read cycle, that the first package remains in the read region when operating in the search mode;
    determining, during a second read cycle, that a second package is new to the read region using the RFID reader operating in the inventory mode; and
    determining, during multiple read cycles, that the first package and the second package remain in the read region when operating in the search mode.

11. The method of claim 7, wherein determining that the first package is stationary in the read region comprises:
    detecting the first package using a second RFID antenna, wherein the second RFID antenna has a read region covering a second package storage region neighboring the first package storage region;
    determining a location of the first package in the read region using information obtained when detecting the first package using the first RFID antenna and the second RFID antenna; and
    determining that the location of the first package corresponds to a location of the first package storage region.

12. The method of claim 7, wherein determining that the first package is stationary in the read region comprises:
    determining the first package remains in the read region of the first RFID antenna for a predetermined number of read cycles of the RFID reader when operating in the search mode.

13. The method of claim 7, further comprising:
    failing to detect the first package using a second RFID antenna, wherein the second RFID antenna has a read region covering a second package storage region neighboring the first package storage region; and
    determining the first package is stored in the first package storage region in response to failing to detect that the first package within the read region of the second RFID antenna.

14. The method of claim 7, further comprising:
    detecting the first package using a second RFID antenna, wherein the second RFID antenna has a read region covering a second package storage region neighboring the first package storage region; and
    determining the first package is not stored in the first package storage region in response to detecting the first package using the second RFID antenna.

15. A system comprising:
    a first RFID antenna comprising a read region covering a first package storage region;
    a RFID reader configured to transmit RFID signals when operating in an inventory mode and a search mode, wherein, when in the inventory mode, the RFID reader is configured to identify IDs for a plurality of packages in the read region, and wherein, when in the search mode, the RFID reader is configured to use an ID of an RFID tag on a first package to search for the first package within the read region; and
    a RFID controller configured to:
        determine that the first package is new to the read region using the RFID reader operating in the inventory mode,
        in response to determining the first package is new to the read region, determine that the first package remains in the read region using the RFID reader operating in the search mode,
        determine that the first package is stationary in the read region based on information obtained while operating in the search mode, and
        indicate that a location of the first package corresponds to a location of the first package storage region.

16. The system of claim 15, wherein the RFID controller is configured to:
    determine that a second package is new to the read region of the first RFID antenna using the RFID reader operating in the inventory mode;
    determine that the second package is moving in the read region using information obtained when the RFID reader operates in the search mode; and
    determine that the second package is in transit and is not stored in the first package storage region.

17. The system of claim 15, wherein the RFID controller is configured to:
    switch the RFID reader between the inventory mode and the search mode to detect the first package a plurality of times before determining that the first package is stationary in the read region.

18. The system of claim 17, wherein, when switching the RFID reader between the inventory mode and the search mode, the RFID controller is configured to:

determine, during a first read cycle, that the first package remains in the read region when operating in the search mode;

determine, during a second read cycle, that a second package is new to the read region using the RFID reader operating in the inventory mode; and determine, during multiple read cycles, that the first package and the second package remain in the read region when operating in the search mode.

19. The system of claim 15, further comprising:

a second RFID antenna comprising a read region covering a second package storage region neighboring the first package storage region, wherein when determining that the first package is stationary in the read region, the RFID controller is configured to:

detect the first package using the second RFID antenna;

determine a location of the first package in the read region using information obtained when detecting the first package using the first RFID antenna and the second RFID antenna; and determine that the location of the first package corresponds to a location of the first package storage region.

20. The system of claim 19, wherein the first RFID antenna is disposed overhead the first package storage region and the second RFID antenna is disposed overhead the second package storage region, wherein the first and second package storage regions each can store multiple packages.

* * * * *